United States Patent
Gidding

(10) Patent No.: US 6,397,644 B1
(45) Date of Patent: Jun. 4, 2002

(54) SERVICE VEHICLE LADDER LOCK

(76) Inventor: Mark Douglas Gidding, 805 Pole Line Rd., Apt. 19, Davis, CA (US) 95616

( * ) Notice: Subject to any disclaimer, the term of this patent is extended or adjusted under 35 U.S.C. 154(b) by 0 days.

(21) Appl. No.: 09/575,827

(22) Filed: May 18, 2000

(51) Int. Cl.$^7$ .............................................. E05B 73/00
(52) U.S. Cl. ........................ 70/18; 70/14; 70/19; 70/58; 224/310; 224/309; 224/315; 224/316; 224/488; 224/321; 414/462; 292/113; 292/104; 292/66; 292/241; 292/200; D8/330; D8/331; D8/336; D8/338; 182/127
(58) Field of Search ................................ 70/18, 14, 19, 70/58; 224/310, 315, 309, 316, 488, 321, 322, 323, 324, 325; 414/462; 182/127; 292/113, 104, 66, 241, 200, 63; D8/330, 331, 336, 338, 339

(56) References Cited

U.S. PATENT DOCUMENTS

| | | | |
|---|---|---|---|
| 3,722,766 A | * 3/1973 | Barrineau et al. | 224/42.1 F |
| 3,731,428 A | * 5/1973 | Glass et al. | 46/243 LV |
| 3,955,731 A | * 5/1976 | Lindelef et al. | 224/42.1 |
| 4,527,827 A | * 7/1985 | Maniscalco et al. | 296/3 |
| 4,826,387 A | * 5/1989 | Audet | 414/462 |
| 4,923,103 A | * 5/1990 | Sauber | 224/42.45 R |
| 5,257,839 A | * 11/1993 | Nielson et al. | 292/113 |
| 5,462,249 A | * 10/1995 | Calzone | 248/316.7 |
| D364,082 S | * 11/1995 | Weinerman et al. | D8/331 |
| 5,553,760 A | * 9/1996 | Wright et al. | 224/316 |
| 5,626,373 A | * 5/1997 | Chambers et al. | 292/113 |
| 5,628,381 A | * 5/1997 | Markovich et al. | 182/107 |
| 5,630,507 A | * 5/1997 | Baker | 206/370 |
| 5,850,891 A | * 12/1998 | Olms et al. | 182/127 |
| 5,918,488 A | * 7/1999 | Deeter | 70/14 |
| 6,041,721 A | * 3/2000 | Weston | 108/65 |
| 6,135,686 A | * 10/2000 | Chasen | 410/120 |

FOREIGN PATENT DOCUMENTS

FR        0 679 794 A1 * 11/1995

* cited by examiner

Primary Examiner—William A. Cuchlinski, Jr.
Assistant Examiner—Ronnie Mancho
(74) Attorney, Agent, or Firm—Richard T. Holzmann

(57) ABSTRACT

A service vehicle ladder lock for fastening a step or extension ladder to a conventional ladder rack running either along a side of the roof of the vehicle or across the top thereof. This ladder lock forms a rectangular framework for placement about the ladder and the ladder rack in close proximity to inhibit movement in any direction upon rapid starting or stopping. In the preferred configuration the ladder lock comprises three portions of narrow bent flat metal stock fastened together wherein the first and second portions are attached by a hinge to allow opening and closing; and the second and third portions are attached to each other. The free end of the first portion has a strike plate thereon for receiving the latch of a tension latch/lock assembly integrally mated to the free end of the third portion. This ladder lock optionally includes means for adjusting the frame width and/or height to insure a close fit around the ladder and the ladder frame to insure safety and security thereof. Another embodiment is structured for use with a ladder rack made from pipe stock.

5 Claims, 6 Drawing Sheets

SERVICE VEHICLE LADDER LOCK

FIELD OF THE INVENTION

This invention relates in general to attachment brackets for vehicles, and more particularly for lockable attachment brackets for holding ladders on vehicles.

BACKGROUND OF THE INVENTION

Ladders are commonly used on service vehicles catering to industrial, commercial and residential clients . . . they can be found most everywhere. Many trucks and other vehicles used to transport equipment have racks on which a ladder may be placed. Typically, one finds racks for holding ladders on pick-up trucks and on the roofs of small vans. These racks are frequently clamped to roof drip rails, however, they do not include means for securing the ladder to the rack.

Consequently, ladders are frequently tied to the vehicle rack and may become loose during transport. Ropes used for tying oftentimes loosen and become undone due to vibration, so-called "bungee" cords and rubber straps break; such events can injure the user and create severe safety problems for others if the vehicle is moving. Furthermore, when left unattended, ladder theft is a common problem with these tying methods. Many locking systems use C- or U-shaped brackets which allow a rolling-out from the locked position making theft relatively simple.

Methods of attachment other than tying are also not without their problems. Conventional chain/padlock combinations rust and are somewhat cumbersome to use. In inclement weather, ease and rapidity of untying or unlocking is of special importance; conventional ladder locks usually take several minutes to engage and disengage. Additionally, typical means for locking a ladder to a rack have protrusions. These cause snagging on trees and wires, etc., which is commonplace since the vast majority of these service vehicles go to residences.

Therefore, an improved lockable attachment bracket for holding a ladder on a vehicle rack, and preventing its unauthorized removal, would be highly advantageous. The lock/bracket combination should be easy to use, quick to lock and unlock, and simple enough in design and rugged enough in construction to provide years of dependable service.

Applicant is aware of prior art ladder supports. For example, U.S. Pat. No. 5,154,258 issued to Krukow is for a lockable ladder securing bracket which includes a spring-loaded pivoting arm which clamps down over a ladder rung to hold the ladder in place. The pivoting arm is L-shaped and is attached to a lever which can be locked in place (with a conventional separate lock). A second arm prevents the ladder from swinging out under the L-shaped arm. This invention is a relatively complicated system requiring: 1) a pair of spaced brackets; 2) the need to engage both the ladder frame and the ladder rung; and 3) a significant number of elements including a separate lock and appropriate tools.

Nikula et al discloses in U.S. Pat. No. 5,383,533 a ladder clamping tool for holding a ladder in a fixed position relative to a rain gutter which conceivably could be used to hold a ladder on a rack as well. However, being of a general C-shaped configuration, it suffers from the possibility of loosening and twisting due to vibration and slippage through the opening of the C; similar problems exist with a U-shaped configuration. Additionally, the lock C-clamp of U.S. Pat. No. 4,912,949 issued to Bowers might also be used to act as a ladder lock on a service vehicle rack, yet still suffers from some of the C-clamp problems.

In view of the above-identified problems associated with the prior art methods of securing a step ladder or an extension ladder to a cargo-style service vehicle rack, the objects of the instant invention are enumerated below.

It is an object of this invention to provide a ladder lock of few components and of essentially one-piece construction, thereby eliminating the use of straps and ties.

It is an additional object to provide a ladder lock wherein the lock is fully integrated with the bracket.

It is a further object to provide a ladder lock without protrusions, said protrusions oftentimes snagging tree branches, wires, etc., especially when working in residential areas.

It is an additional object to provide a ladder lock which can be engaged and disengaged in less than one minute.

It is another object to provide a ladder lock of totally enclosed structure to avoid the potential problems associated with C- and U-shaped brackets.

It is a further object to provide a ladder lock which is prevented from lengthwise sliding with both width adjusting holes and tension adjusting screws for height control.

It is an additional object to provide a ladder lock bracket which can be accommodated to fit on the commonly seen pipe racks.

It is also an object to provide a ladder lock bracket which can be accommodated to fit on a vehicle having only cross support racks as well as those having side rails.

It is yet a further object to provide a ladder lock whose design allows simplicity of manufacture, minimization of cost and rapidity of set-up and removal.

It is thus an object of the invention to eliminate the need for additional tools, for more than one bracket in each application, and for a separate padlock, for example.

SUMMARY OF THE INVENTION

A ladder lock for connecting a ladder to a vehicular ladder rack for safety and security comprising: three portions of narrow flat metal stock fastened together to form a frame structure in a rectangular configuration; a first portion connected to a second portion by a back flap hinge; said second portion connected to a third portion; a strike plate integrally affixed to the free end of said first portion; a tension latch assembly, having a lock as an integral part thereof, affixed to the free end of said third portion for latching with said strike plate thereby closing and locking the frame about said ladder and said ladder rack.

The ladder lock wherein said hinge having a plurality of holes therein for alignment with holes in said first or second portions for receiving fasteners for adjusting the width of the frame structure. The ladder lock further comprising a threaded stud for insertion into said third portion having a threaded hole therein for connecting within said vehicular ladder rack having a smooth hole therein for preventing sliding movement of the ladder. The ladder lock further comprising a tension adjusting screw and lock nut combination for insertion into said third portion from either side thereof through a threaded hole therein for adjusting the height of the frame structure. The ladder lock further comprising an adapter plate to be used in connection with a cross support vehicular roof rack, said adapter plate having fastening means therein for fastening to a cross support upright bracket vertically and having a channel formed therein for seating said flat stock of the frame structure.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
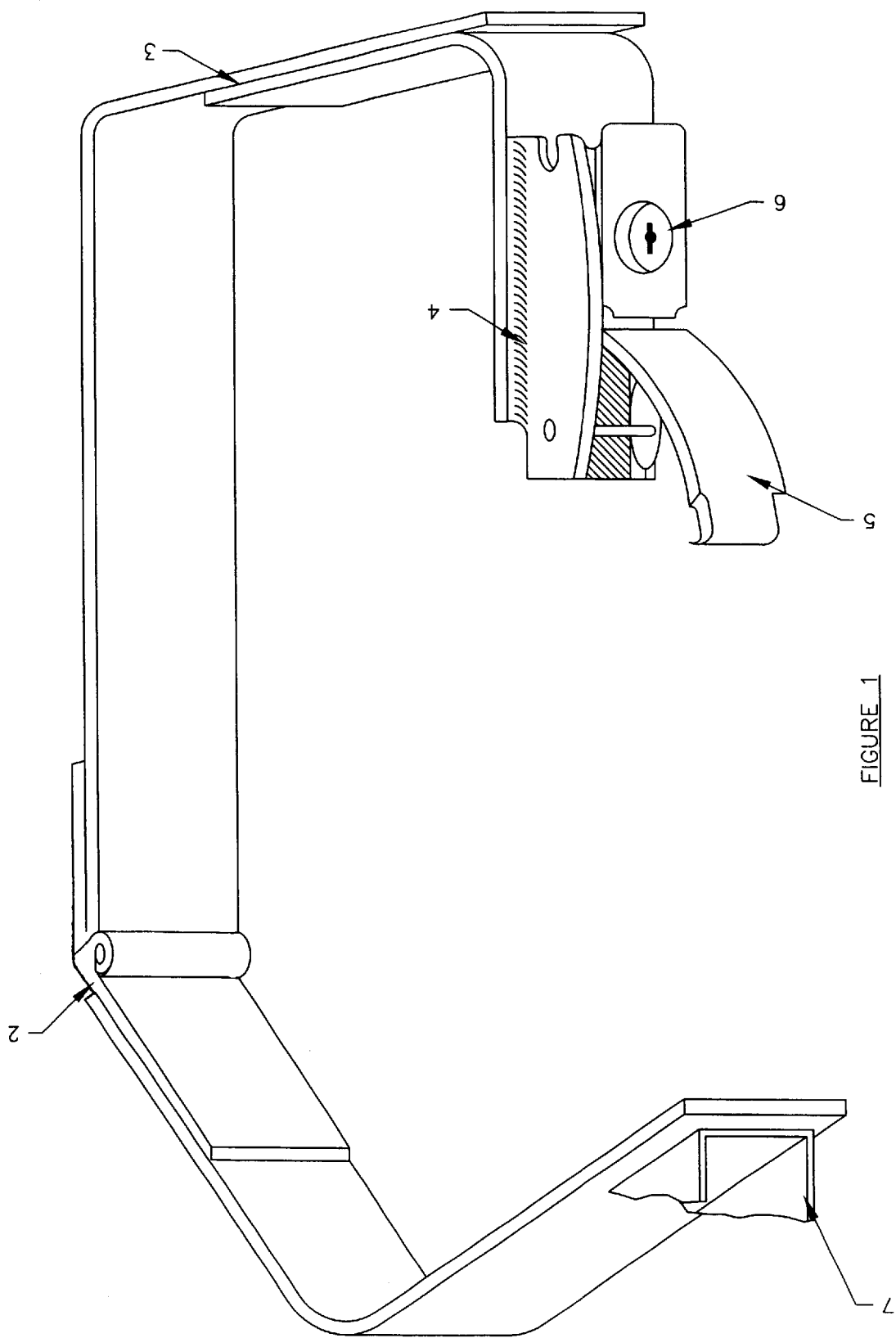
FIG. 1 is an isometric view of the invention in an open position wherein the hinge is welded to the frame; this general purpose embodiment allows no adjustment in width or height.

In accordance with the preferred embodiment of the present invention there is provided a new and improved service vehicle ladder lock assembly which is sturdy in construction and which includes a relatively narrow hinged flat metal stock portion having a tension adjusting screw for adjusting height, a means for adjusting width, and a tension latch/lock assembly with lock as integral parts thereof in a nested relation to provide, in effect, a rectangular frame.

More particularly, the inventive rectangular frame can be placed around the doubled side rail of both an extension or step ladder and the rail support running the length of the vehicle. The length of the frame's periphery can be adjusted to accommodate racks of varying dimensions; while a tension adjusting screw can assure that a ladder is held snugly against a rack. In this manner, sliding and/or swingout of the ladder from the rack is prevented. Meanwhile, the lock considerably reduces the risk of ladder theft. It should be pointed out that while different sized brackets can be provided to snugly fit various rack/ladder configurations, thereby obviating the need for width adjusting holes and tension adjusting screws at lower cost, the increase in required inventory costs would probably offset any savings.

The location of the latch/lock against the flat side rail is best to inhibit prying loose as compared with partially above the side rail which leaves a free space between the ladder lock and ladder rail. Such free space can easily be used to place a crowbar therebetween for prying open for example.

While the materials which may be used are many, aluminum has some special advantages due to machineability, overall weight and cost, and non-corrosive nature. Certainly, fiber-reinforced plastics and other engineered plastics have been considered, however these are readily cut and are not inexpensive.

This invention includes a number of different embodiments, all of which are based upon a generally rectangular frame having a tension latch/lock assembly as an integral portion thereof, which may be briefly summarized as follows:

1. a general purpose service vehicle ladder lock assembly having no adjustable features;
2. a custom fit for either a step or extension ladder to a ladder rack or side rail bracket;
3. modified for when the side rail is round pipe;
4. for a ladder with height adjustment only;
5. for a ladder with height and width adjustment;
6. an adapter plate for use with cross support racks, i.e., those without a side rail;
7. Modification of the above with a stud to prevent forward or backward sliding of the ladder; and
8. Modification of 5 above having a slot at top and bottom thereof in place of holes/bolts to give variable width.

It should be emphasized that while a single ladder lock/framework of the instant invention placed in the center of the ladder rack will eliminate swingout of the ladder, increased stress of the ladder lock will probably reduce its lifetime. Better results are achieved when two ladder locks are used, one at each end.

Figure 2:
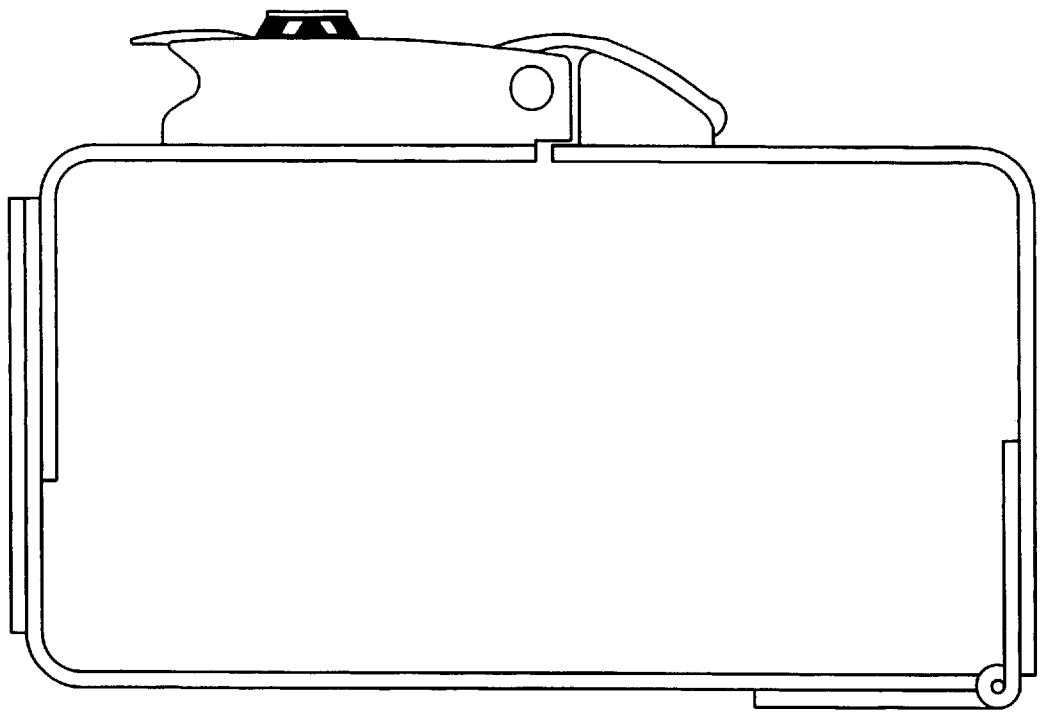
FIG. 2 is a side view of FIG. 1 in a closed locked position.
Figure 2A:
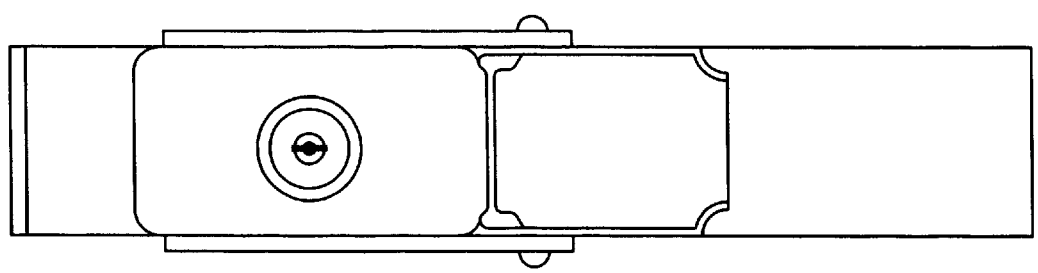
FIG. 2A is a front view of FIG. 2.
Figure 2B:
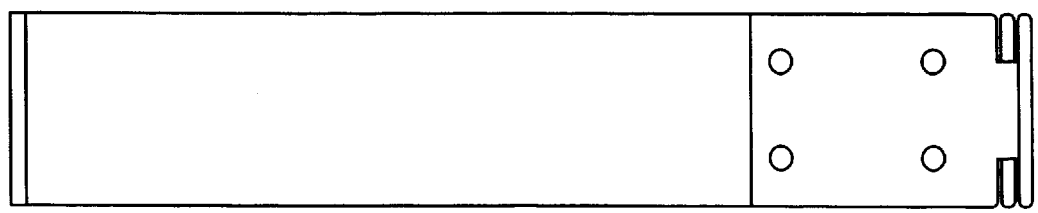
FIG. 2B is a back view of FIG. 2.

Referring to FIG. 1 there is shown a general purpose service vehicle ladder lock assembly in an open unlocked position. This embodiment is the simplest to manufacture but allows no adjustment in width or height. Flat steel stock ⅛"×½" has been found suitable for frame material 1, although other materials and dimensions can certainly be used. A back flap hinge 2 welds two bent portions of flat stock of a first short portion and a second longer portion together. On the second longer portion of flat stock, a weld 3 is formed to a third bent flat stock portion. This third portion also has welded to it a 5 inch draw hasp with lock. The most suitable lock for this purpose is one that is commercially available of a type described in U.S. Pat. No. 5,257,839 issued in 1993 to Nielsen et al and shown in the drawing. The tension latch assembly 4 itself comprises a latch 5 and lock 6 welded to the third portion of flat stock which joins with a strike plate 7 welded to the first portion of flat stock when the ladder lock is closed around the ladder and rack. FIG. 2 is a side view of FIG. 1 in the closed locked position, whereas FIGS. 2A and 2B are front and back views respectively of FIG. 2.

Figure 3:
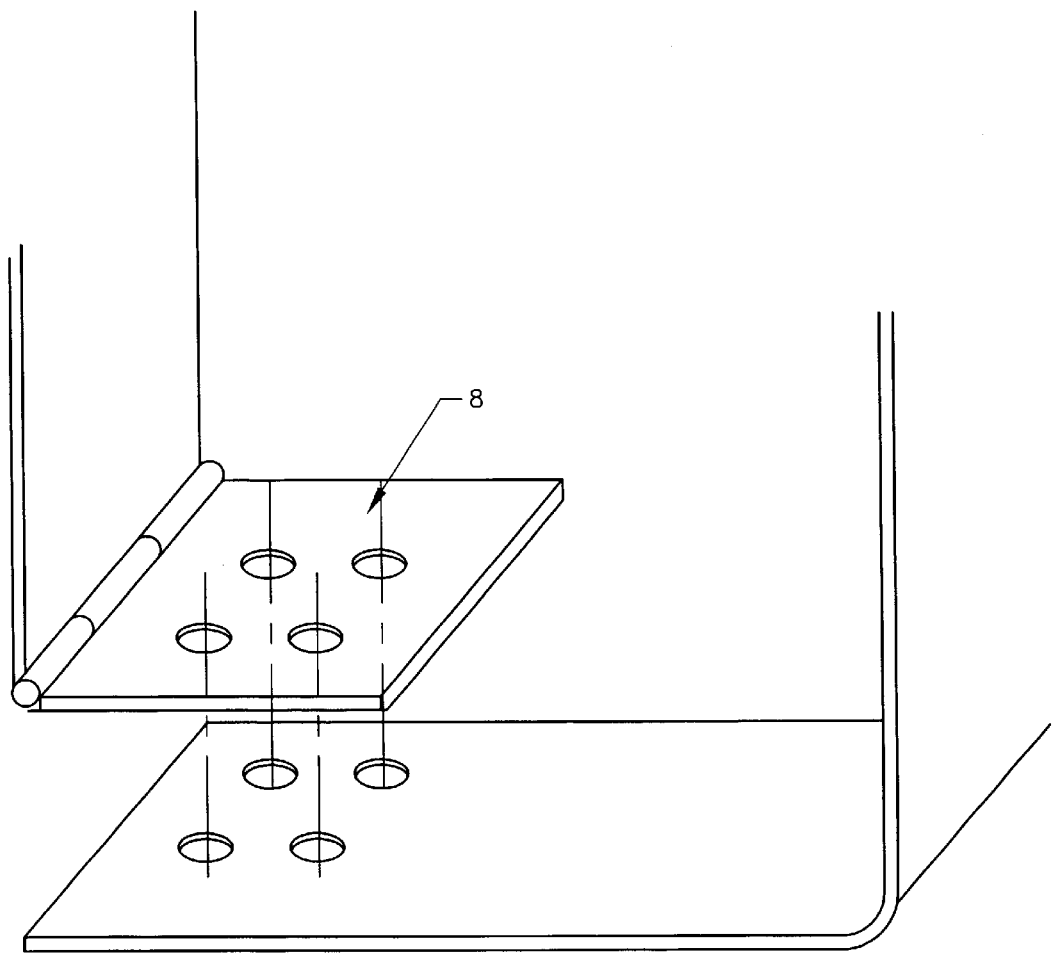
FIG. 3 is an isometric exploded view of a hinge having holes of a second embodiment of the invention illustrating means for adjustment of width (from front view of FIG. 2A, i.e., from front to back)

It should be emphasized that while FIGS. 1 and 2 illustrate a ladder lock with three portions of flat stock 1 welded together, this need not be the only method of construction. They could, of course, be connected in other ways using bolts, screws and the like. Furthermore, the hinge 2 which is shown as hole-free could just as easily be a conventional one having holes therein 8 as illustrated in FIG. 3. Actually, having holes therein allows one to control width adjustment by having this portion of hinge 2 connect with a series of holes of a larger number in the flat stock 1 to which hinge 2 is to be joined. This embodiment allows a degree of versatility in the ladder lock which is absent in that lock illustrated in FIG. 1.

Figure 4:
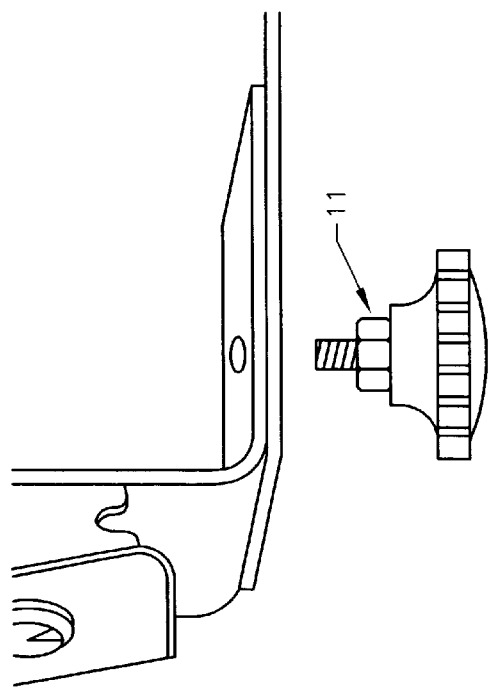
FIG. 4 is an isometric view of the lower portion of the invention illustrating a curvature to snugly fit a ladder rack made of pipe stock.

Most vehicle cargo side rail racks have flat right angular surfaces, and thus the above cited examples are well-suited to providing a relatively tight fitting thereabout; many are also made of pipe stock, especially on sport utility vehicles and other light weight-carrying applications. Therefore, a third embodiment of the invention as shown in FIG. 4 illustrates a lower inner curved surface 9 to snugly accommodate a ladder rack made of pipe stock.

Figure 4B:
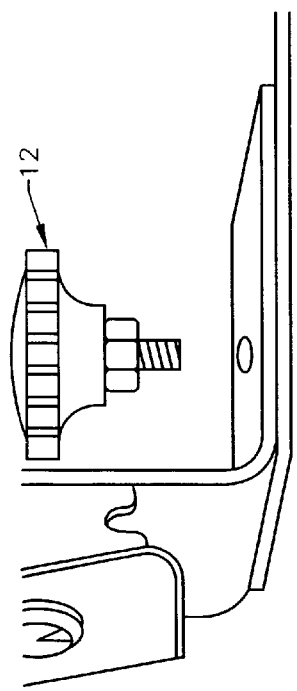
FIG. 4B and FIG. 4C illustrate variations in adjusting for space differentials between a ladder and rack in terms of height adjustment from top to bottom.
Figure 4A:
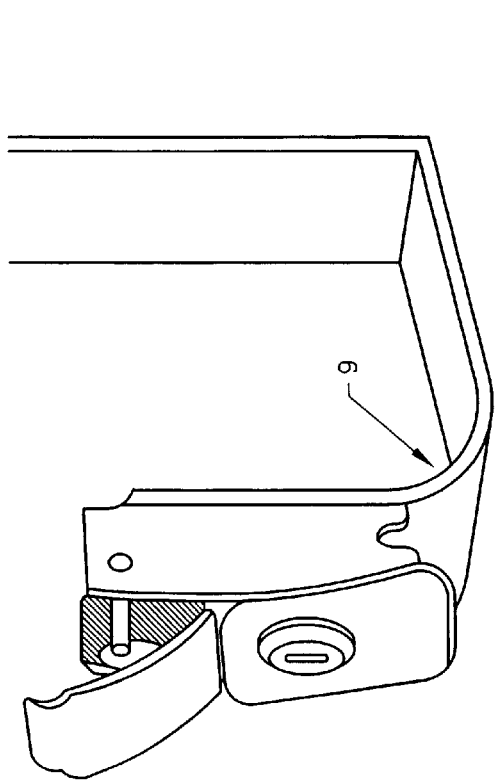
FIG. 4A is an exploded isometric view of a lower outside corner of the invention showing a threaded hole therein and a threaded stud for placement through said threaded hole into a smooth hole in a ladder rack to prevent shifting of the ladder in event of rapid starting and stopping.
Figure 4C:
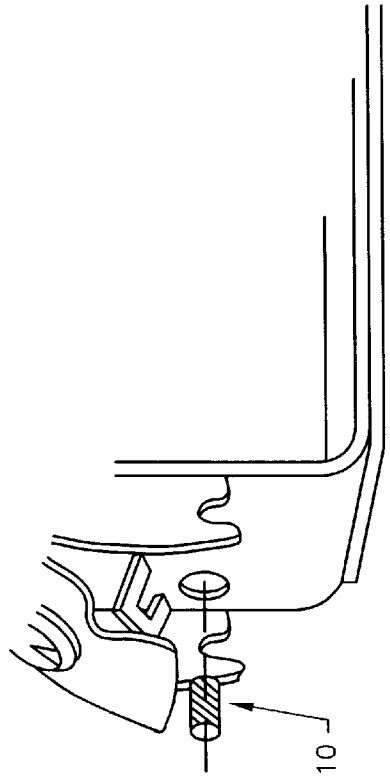

FIGS. 4A, 4B and 4C illustrate other means of insuring that a tight fit is maintained within the ladder lock and about the ladder and the rack. This is most important to insure that there is little "play" in the movement of the ladder when the vehicle is driven. Not only since movement will eventually weaken the entire system, but movement also indicates a loose fit which lends itself to having the lock forced in attempted theft of the ladder . . . a common occurrence. FIG. 4A in an exploded view near a lower outside corner of the invention showing a threaded stud 10 for mating with a threaded hole in the third portion of flat stock for insertion into a smooth hole in a ladder rack (not shown) to prevent shifting of the ladder lock in the event of rapid starting or stopping of the vehicle. This hole in the ladder rack would need to be drilled as part of an original set-up of the system.

Figure 4D:
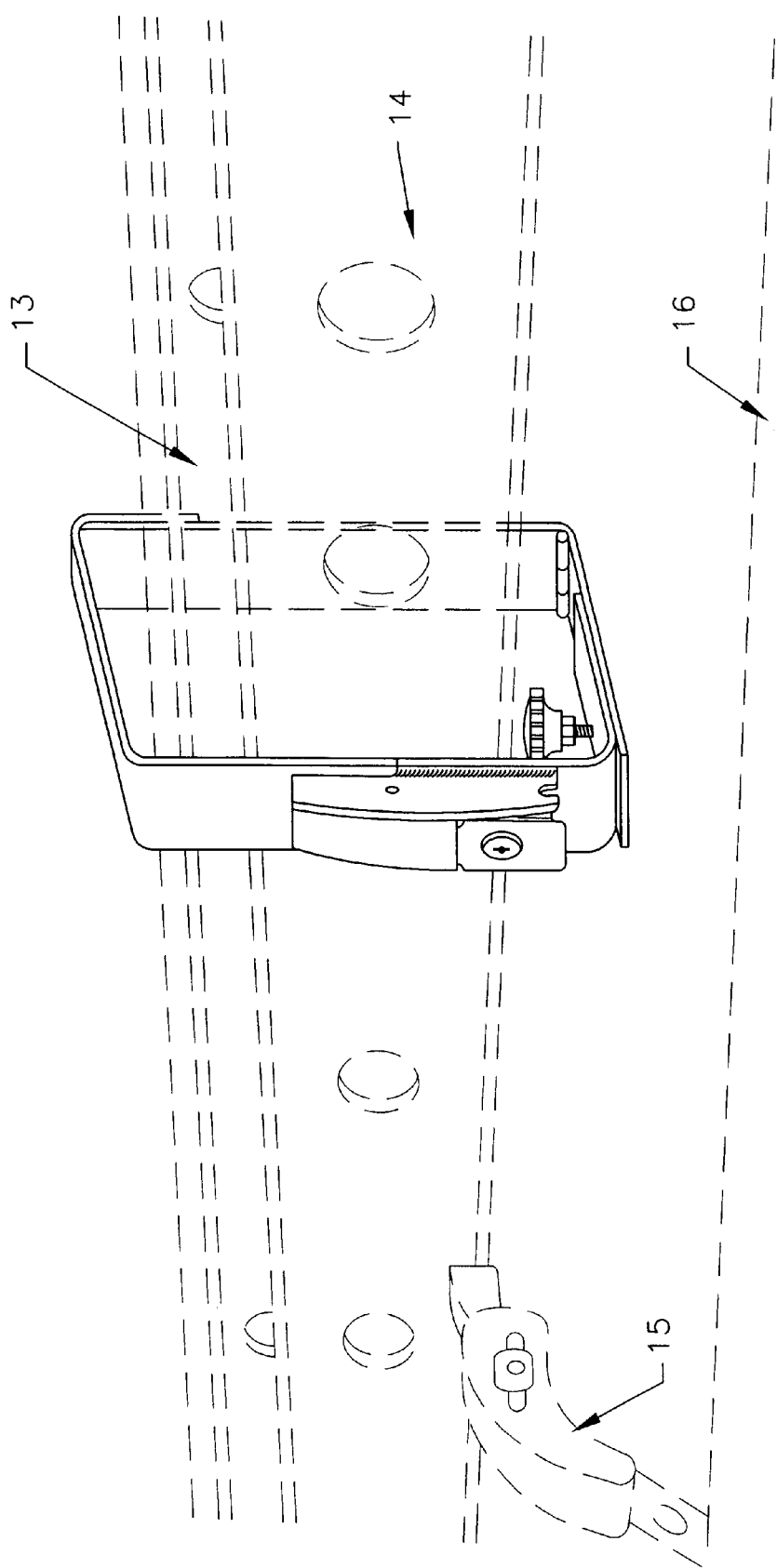
FIG. 4D is a perspective view of a height adjustable ladder lock of the invention in place about a vehicle side rail ladder rack and ladder. The hinge at the lower right-hand corner would be better placed at the upper left-hand corner.

FIGS. 4B and 4C illustrate variations in means for adjusting for space differentials between a ladder and rack in terms of height from top to bottom. Tension adjusting screw 11 with its lock nut, often of nylon, in FIG. 4B is in the position shown when a height/tension adjustment setting is approximately less than 1 inch; whereas position 12 shown in FIG. 4C is used when the adjustment setting is greater than one inch. In both positions, the end of the screw is pushed against the bottom lip of the side rail. FIG. 4D illustrates the ladder lock of the invention in place about a ladder 13 and a vehicle ladder rack 14. Roof mounting bracket 15 connects ladder rack 14 to the vehicle; the vehicle roof/gutter is represented by element 16.

Figure 5A:
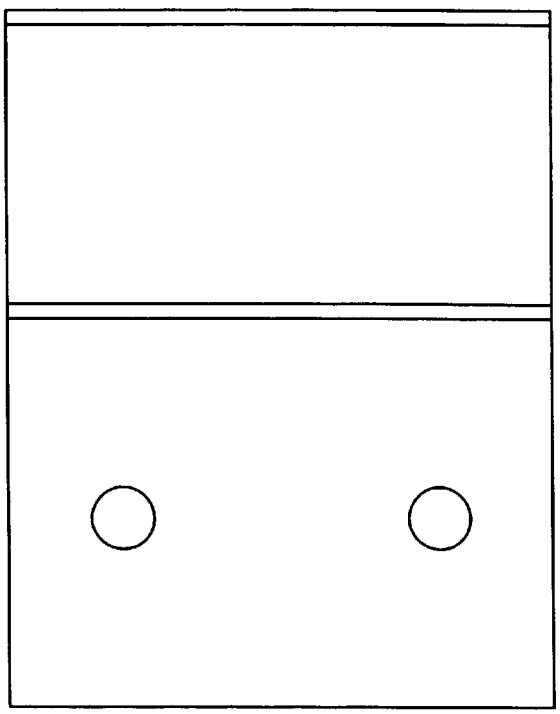
FIGS. 5A and 5B are front and bottom views respectively of FIG. 5.
Figure 5B:
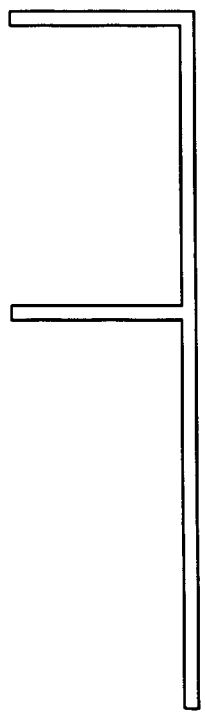
Figure 5:
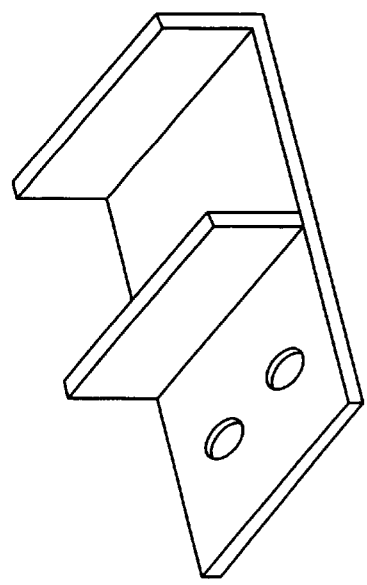
FIG. 5 is an isometric view of an adapter plate for ladder racks having no side bar running the length of the rack; to be attached vertically to side cross support upright brackets of a cargo/ladder rack thus forming a channel in which the ladder lock can be placed.

FIG. 5 shows an isometric view of an adapter plate 17 for ladder racks having no side bar running the length of the rack. This plate 17 is bolted, for example, vertically to a side cross support upright bracket of a cargo/ladder rack thus forming a channel in which the ladder lock of the invention can be placed. FIGS. 5A and 5B are front and bottom views respectively of FIG. 5.

Since the present invention is constituted as explained above, the meritorious effects of the preferred embodiment of this invention as enumerated below are readily achieved by use of a rectangularly framed bracket having integrated therewith a tension latch/lock assembly which can lock a ladder to a vehicular rack. Thus, the instant invention eliminates the need for separate padlocks, straps, ties, ropes, and special tools. It overcomes the problem of roll-out experienced with C- and U-shaped brackets. Furthermore, the invention in its preferred configuration because of its adjustment features, presents a system tightly holding the ladder to the rack insuring security from theft as well as injury. And, it does this at low cost for both conventional and pipe stock.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A ladder lock for connecting a ladder to a service vehicle ladder rack for safety and security comprising:

three portions of narrow flat metal stock bent and fastened together to form a frame structure in a generally rectangular configuration;

a first portion having a strike plate integrally affixed to its one end connected at its other end to a second portion by a back flap hinge leaving said second portion with one free end;

said free end of said second portion connected to one end of a third portion, said third portion having a tension latch/lock assembly integrally affixed to its other end for latching with said strike plate for closing and locking the frame about said ladder and said ladder rack.

2. The ladder lock in accordance with claim 1 wherein said hinge having a plurality of holes therein for alignment with holes in said first or second portions for receiving fasteners for width adjustment of the frame structure.

3. The ladder lock in accordance with claim 1 further comprising a threaded stud for placement into said third portion having a threaded hole therein for insertion within said vehicular ladder rack having a smooth hole therein for preventing sliding movement of the ladder.

4. The ladder lock in accordance with claim 1 further comprising a tension adjusting screw/lock nut combination for insertion into said third portion from either side thereof through a hole therein for height adjustment of the frame structure.

5. The ladder lock in accordance with claim 1 further comprising an adapter plate to be used in connection with a vehicular roof rack cross support upright bracket system, said adapter plate having fastening means therein for fastening to said bracket vertically and having a channel formed therein for seating said flat stock of the frame structure.

* * * * *